(12) United States Patent
Park et al.

(10) Patent No.: US 7,710,085 B2
(45) Date of Patent: May 4, 2010

(54) ENERGY TRANSFER ELEMENT AND CONVERTER INCLUDING THE SAME

(75) Inventors: Young-Bae Park, Anyang (KR); Jin-Tae Kim, Seoul (KR); Gwan-Bon Koo, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 336 days.

(21) Appl. No.: 11/985,159

(22) Filed: Nov. 14, 2007

(65) Prior Publication Data

US 2008/0247206 A1 Oct. 9, 2008

(30) Foreign Application Priority Data

Apr. 5, 2007 (KR) .................. 10-2007-0033561

(51) Int. Cl.
*G05F 1/33* (2006.01)
*H01F 27/32* (2006.01)

(52) U.S. Cl. ............... 323/251; 323/332; 336/84 C; 336/170

(58) Field of Classification Search ......... 323/247–351, 323/328–338; 336/84 C, 170, 180–185
See application file for complete search history.

(56) References Cited

U.S. PATENT DOCUMENTS

| | | | |
|---|---|---|---|
| 2,553,324 A | 5/1951 | Lord | |
| RE31,840 E * | 2/1985 | Harris et al. | ............ 363/97 |
| 4,876,638 A * | 10/1989 | Silva et al. | ............... 363/97 |
| 6,549,431 B2 | 4/2003 | Odell et al. | |
| 6,977,803 B2 | 12/2005 | Park | |
| 6,982,621 B2 | 1/2006 | Park | |
| 7,123,121 B2 | 10/2006 | Park | |
| 7,373,714 B2 * | 5/2008 | Akselrod et al. | ....... 29/602.1 |

* cited by examiner

*Primary Examiner*—Jessica Han
(74) *Attorney, Agent, or Firm*—Sidley Austin LLP (57) ABSTRACT

An energy transfer element includes a first winding coupled to an input circuit and a second winding coupled to an output circuit. The first winding has a first unit and a second unit, and the second winding is wound between the first unit of the first winding and the second unit of the first winding. The energy transfer element further includes a third winding provided between the first unit of the first winding and the second winding. The third winding is used to supply a bias voltage of the input circuit, and a winding width of the third winding is greater than a winding width of the first unit of the first winding and a width of the second winding.

20 Claims, 6 Drawing Sheets

ENERGY TRANSFER ELEMENT AND CONVERTER INCLUDING THE SAME

CROSS-REFERENCE TO RELATED APPLICATION

This application claims priority to and the benefit of Korean Patent Application No. 10-2007-0033561 filed in the Korean Intellectual Property Office on Apr. 5, 2007, the entire contents of which are incorporated herein by reference.

BACKGROUND

1. Field of the Invention

The present invention relates to an energy transfer element. More particularly, the present invention relates to an energy transfer element for minimizing a number of shields.

2. Description of the Related Art

A converter is a device for converting a DC voltage into at least one DC voltage. To achieve this purpose, the converter uses an energy transfer element and particularly uses a transformer as the energy transfer element.

Parasitic capacitances may exist between a primary coil and a secondary coil of the transformer, which may generate a displacement current when the converter is operated. The displacement current generates electromagnetic interference (EMI). In general, in order to control the displacement current, a shield, such as a conductive shield or a winding shield, is inserted between the primary winding and the secondary winding of the transformer to thus reduce EMI. However, the window size (indicating the part to which the winding is substantially wound) of the core of the transformer is reduced in the case of inserting a plurality of shields so as to reduce the EMI.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include an energy transfer element for reducing the number of shields, and a converter including the same. Embodiments include an energy transfer element with great efficiency and a converter including the same.

An energy transfer element according to an embodiment can include a first winding, a second winding and a third winding. The first winding is coupled to the input circuit and is wound as a first unit and a second unit. The second winding is coupled to the output circuit and is wound between the first unit of the first winding and the second unit of the first winding. The third winding is provided between the first unit of the first winding and the second winding and is coupled to a bias voltage supply circuit for supplying a bias voltage used for the input circuit. A winding width of the third winding is greater than a winding width of the first unit of the first winding and a winding width of the second winding.

The third winding can have a plurality of windings. One of the two terminals of the third winding can be coupled to a ground of the input circuit.

The energy transfer element can further include a fourth winding wound between the second unit of the first winding and the second winding. A first end of the fourth winding can be coupled to the input circuit, and a second end of the fourth winding is opened. A first end of the fourth winding can be coupled to a ground of the input circuit, and a second end of the fourth winding can be opened.

The energy transfer element can further include a conductive shield provided between the second unit of the first winding and the second winding.

The energy transfer element can further include a bobbin on which the first to third windings are wound, and the windings are wound on the bobbin in the order of the second unit the first winding of, the second winding, the third winding, and the first unit of the first winding.

A converter according to an embodiment can include an input circuit, an output circuit, an energy transfer element and a bias voltage supply circuit. The input circuit supplies energy. The output circuit outputs predetermined energy corresponding to the energy supplied by the input circuit. The energy transfer element is coupled between the input circuit and the output circuit and transmits energy of the input circuit to the output circuit with a predetermined ratio. The bias voltage supply circuit generates a bias voltage of an integrated circuit (IC) used for the input circuit. The energy transfer element can include a first winding, a second winding and a third winding. The first winding is coupled to the input circuit and has a first unit and a second unit. The second winding is coupled to the output circuit and is wound between the first unit of the first winding and the second unit of the first winding. The third winding is wound between the first unit of the first winding and the second winding and is coupled to the bias voltage supply circuit, and is used for supplying the bias voltage and reduces a displacement current generated between the first unit of the first winding and the second winding.

A winding width of the third winding can be greater than a winding width of the first of the first winding and a winding width of the second winding. The third winding can has a plurality of windings.

The energy transfer element can further include a bobbin on which the first to third windings are wound, and the windings are wound on the bobbin in the order of the second unit of the first winding, the second winding, the third winding, and the first unit of the first winding.

The energy transfer element can further include a fourth winding, wound between the second unit of the first winding and the second winding, for blocking the displacement current generated between the second unit of the first winding and the second winding.

The energy transfer element can further include a conductive shield, being provided between the second unit of the first winding and the second winding, for blocking the displacement current generated between the second unit of the first winding and the second winding.

DETAILED DESCRIPTION

In the following detailed description, only certain exemplary embodiments of the present invention have been shown and described, simply by way of illustration. As those skilled in the art realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

EMI generated by the operation of a converter is typically generated by a displacement current flowing between an input winding and an output winding of an energy transfer element, which will not be described since it is well known to a person skilled in the art.

Techniques according to embodiments can be applied to flyback converters or to forward converters. In what follows, a transformer may be referred to as an energy transfer element. Embodiments will be described in the context of a flyback converter. However, embodiments can also operate in the context of forward converters. In addition, in order to use the terms that are familiar to a person of ordinary skill in the art, the input winding and the output winding of the energy transfer element will be referred to as a primary winding and a secondary winding, and an input circuit and an output circuit coupled to the input winding and the output winding of the energy transfer element will be mentioned as a primary circuit and a secondary circuit.

Throughout this specification and the claims that follow, when it is described that an element is "coupled" to another element, the element may be "directly coupled" to the other element or "electrically coupled" or "magnetically coupled" to the other element through a third element.

Figure 1:
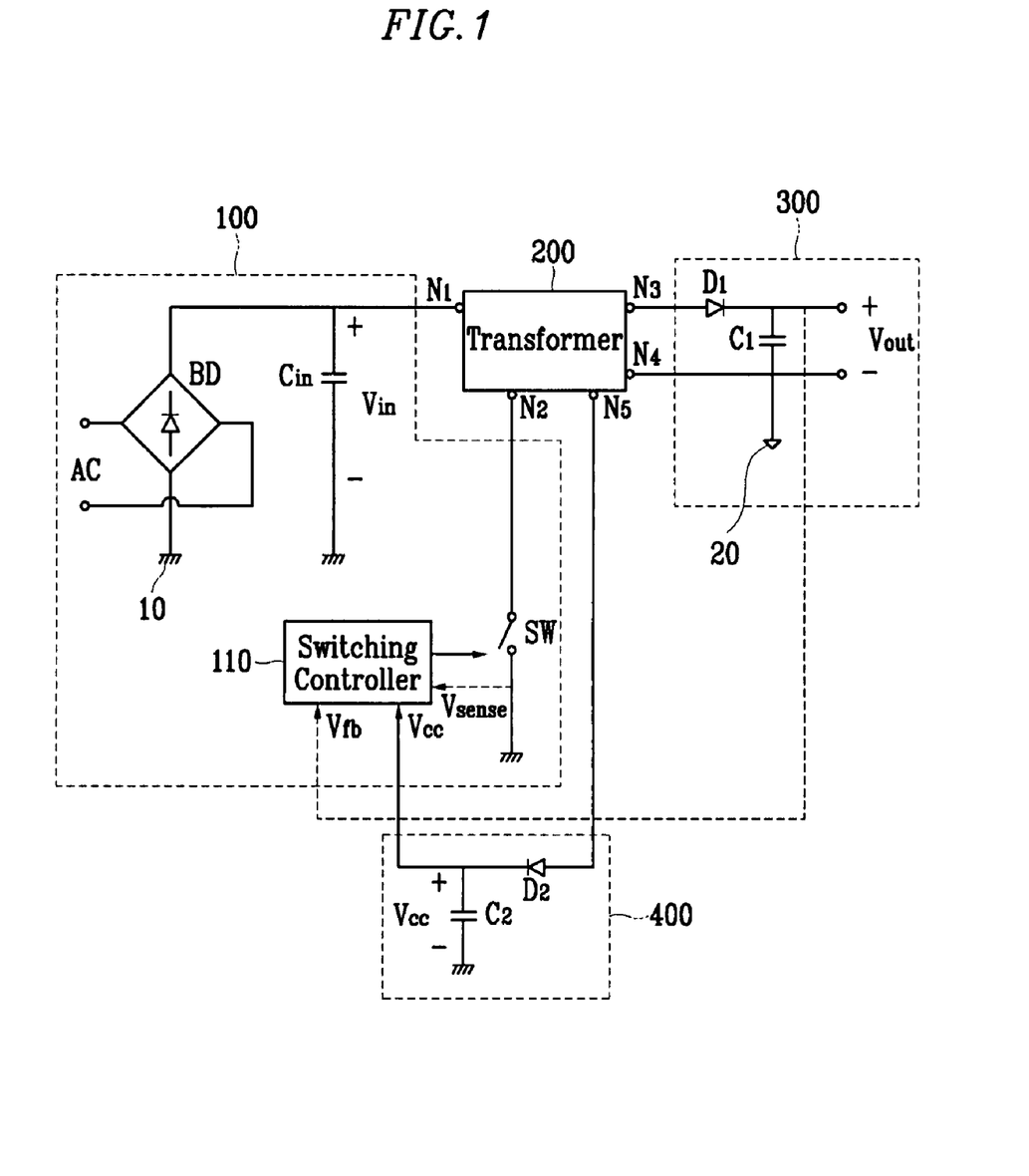
FIG. 1 shows a schematic diagram of a flyback converter.

FIG. 1 illustrates a schematic diagram of a flyback converter, which can include a primary circuit 100, a transformer 200, a secondary circuit 300, and a bias voltage supply circuit 400.

The primary circuit 100 may include a bridge diode BD for rectifying an AC input, a capacitor Cin for smoothing the rectified voltage, a switch SW, and a switching controller 110 for controlling a turn-on/turn-off operation of the switch SW. The switching controller 110 may receive a sensing voltage Vsense that corresponds to the current flowing through the switch SW and a feedback voltage Vfb that corresponds to an output voltage Vout of the secondary circuit 300. The switching controller 110 can be generally realized by a single IC or as an assembly of its components, e.g. on a motherboard. The primary circuit 100 may control the duty, i.e. the frequency and duration of the switching times of the switch SW. Methods for generating the sensing voltage Vsense and the feedback voltage Vfb will not be described since they are well known to a person of ordinary skill in the art. Further, a bias voltage Vcc, used for operating the switching controller 110, can be provided through the bias voltage supply circuit 400.

The secondary circuit 300 may include a diode D1 having an anode connected to a third terminal N3 of the transformer 200 and a capacitor C1 connected between a cathode of the diode D1 and a secondary ground 20. In this architecture, the voltage at the capacitor C1 is essentially an output voltage Vout of the converter.

The transformer 200 can be coupled between the primary circuit 100 and the secondary circuit 300 to transmit the energy provided by the primary circuit to the secondary circuit. The transformer 200 may include a first terminal N1 for receiving an input voltage Vin, a second terminal N2, connected to the switch SW, the third terminal N3, connected to the diode D1, a fourth terminal N4, connected to the secondary ground 20, and a fifth terminal N5, connected to the bias voltage supply circuit 400.

The bias voltage supply circuit 400 may include a diode D2 having an anode connected to the fifth terminal N5 of the transformer 200 and a capacitor C2 connected between the cathode of the diode D2 and the primary ground 10. The bias voltage supply circuit 400 may supply a bias voltage Vcc for operating the IC of the switching controller 110 in some embodiments.

Some embodiments of the transformer 200 reduce the number of shields and have an efficient structure, which will now be described with reference to FIGS. 2 to 6.

Figure 2:
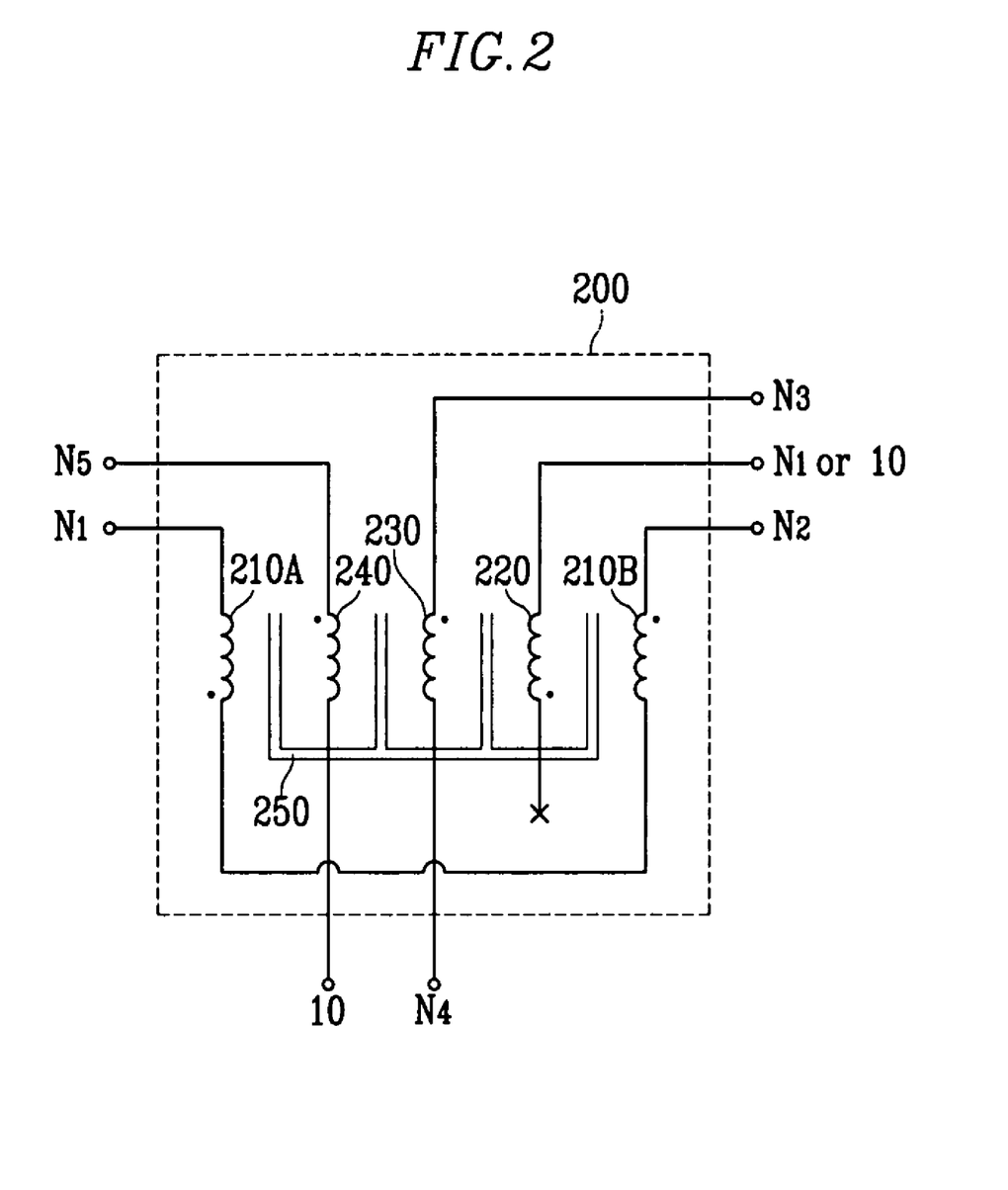
FIG. 2 shows a schematic diagram of a transformer.

FIG. 2 illustrates a schematic diagram of the transformer 200. The transformer 200 may include primary windings 210A and 210B, a shield winding 220, a secondary winding 230, and a bias winding 240. Element 250 illustrates a coupling between the windings through their cores.

Figure 3:
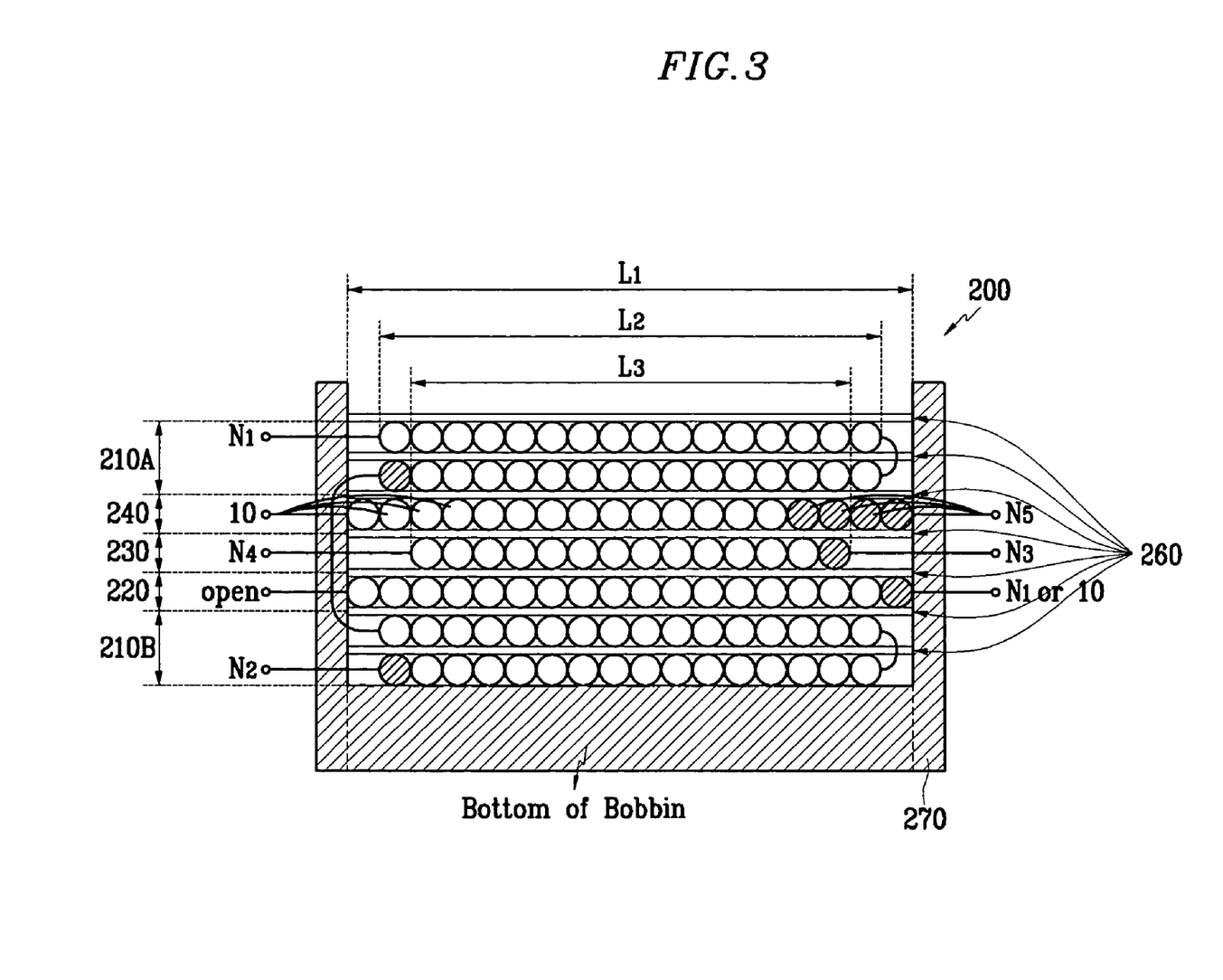
FIG. 3 shows a cross-sectional view of a transformer.

FIG. 3 shows a cross-sectional view of the transformer 200. The transformer 200 may further include a bobbin 270, used for winding the winding, and an insulation tape 260 between the respective windings.

Referring to FIG. 2 and FIG. 3, the primary winding may include two units 210A and 210B, and can have an interleaved structure in which residual windings are positioned between the first unit 210A of the primary winding and the second unit 210B of the primary winding. The first unit 210A of the primary winding can be connected to the first terminal N1 of the transformer 200, and the second unit 210B of the primary winding can be connected to the second terminal N2 of the transformer 200. The second unit 210B of the primary winding may be wound on the bottom of the bobbin 270, the first unit 210A of the primary winding may be wound on the top of the bobbin 270. The second unit 210B of the primary winding and the first unit 210A of the primary winding can be connected with each other.

In some embodiments, the units of the primary winding, 210A and 210B, can have an interleaved structure. In these embodiments, a leakage inductance can be reduced compared to the primary winding with a single unit, thus improving the converter's efficiency.

The shield winding 220 can be disposed between the second unit 210B of primary winding and the secondary winding 230 and is provided near the second unit 210B of the primary winding. A first end of the shield winding 220 can be connected to the first terminal N1 of the transformer, or the primary ground 10, and the second end of the shield winding 220 may be open. The winding width L1 of the shield winding 220 can be greater than the winding width L2 of the primary winding units 210A, 210B and the winding width L3 of the secondary winding 230. FIG. 3 illustrates an embodiment in which the shield winding 220 is wound in one layer, a winding width of the shield winding 220 being greater than the winding widths of the primary winding units 210A and 210B and the winding width of the secondary winding 230 so that the winding width of the shield winding 220 is configured to prevent a displacement current flowing between the primary winding and the secondary winding. The blocking of the displacement current by the shield winding 220, flowing between the second unit of the primary winding 210B and the secondary winding 230, reduces the EMI.

The secondary winding 230 can be connected between the third terminal N3 of the transformer and the fourth terminal N4 of the transformer. The polarities of the various windings are indicated by the dots in FIG. 2. The flyback converter can have a "dot polarity" of the secondary winding 230 that is opposite to that of the primary winding units 210A and 210B. The dot polarity of the secondary winding 230 can be different e.g. in embodiments which utilize a forward converter. The same is true for the dot polarity of the other windings 220 and 240, as shown in FIG. 2: their dot polarity can also be different in embodiments utilizing a forward converter.

The bias winding 240 can be disposed between the first primary winding unit 210A and the secondary winding 230.

Its first end may be connected to the fifth terminal N5 of the transformer, and its second end may be connected to the primary ground 10. In flyback converter embodiments, energy of the primary winding is transmitted to the bias winding 240, and a bias voltage Vcc is generated for the bias voltage supply circuit 400 connected to the bias winding 240. In other words, the bias winding 240 can be used to supply the bias voltage Vcc.

FIG. 3 illustrates that the bias winding 240 can be wound in a single layer, albeit with a plurality of windings (four windings in FIG. 3) in parallel. That is, the bias winding 240 can have a layer in which a plurality of windings are wound in parallel, and the respective windings are connected between the fifth terminal N5 of the transformer and the primary ground 10. When the winding is wound in the entire layer, the bias winding 240 can separate the first unit 210A of the primary winding and the secondary winding 230 to block the displacement current: the bias winding 240 can function as a shield. The displacement current generated by the parasitic capacitance between the bias winding 240 and the primary winding units 210A, 210B may return to the source (an AC input) since the second end of the bias winding 240 is connected to the primary ground 10, thereby reducing the generation of EMI.

In detail, the bias winding 240 can be used to supply the bias voltage Vcc. The bias winding 240 can concurrently function as a shield. In the embodiment of FIG. 3, the bias winding 240 is wound in a single layer, its winding width being greater than the winding widths of the primary winding units 210A, 210B and the winding width of the secondary winding 230, so that the bias winding 240 may function as a shield.

In these embodiments the number of shields can be reduced since the bias winding 240 of the transformer 210 can supply the bias voltage Vcc and function as a shield.

In some embodiments, the shield winding 220 can be used to block the displacement current flowing between the second primary unit 210B and the secondary winding 230.

Figure 4:
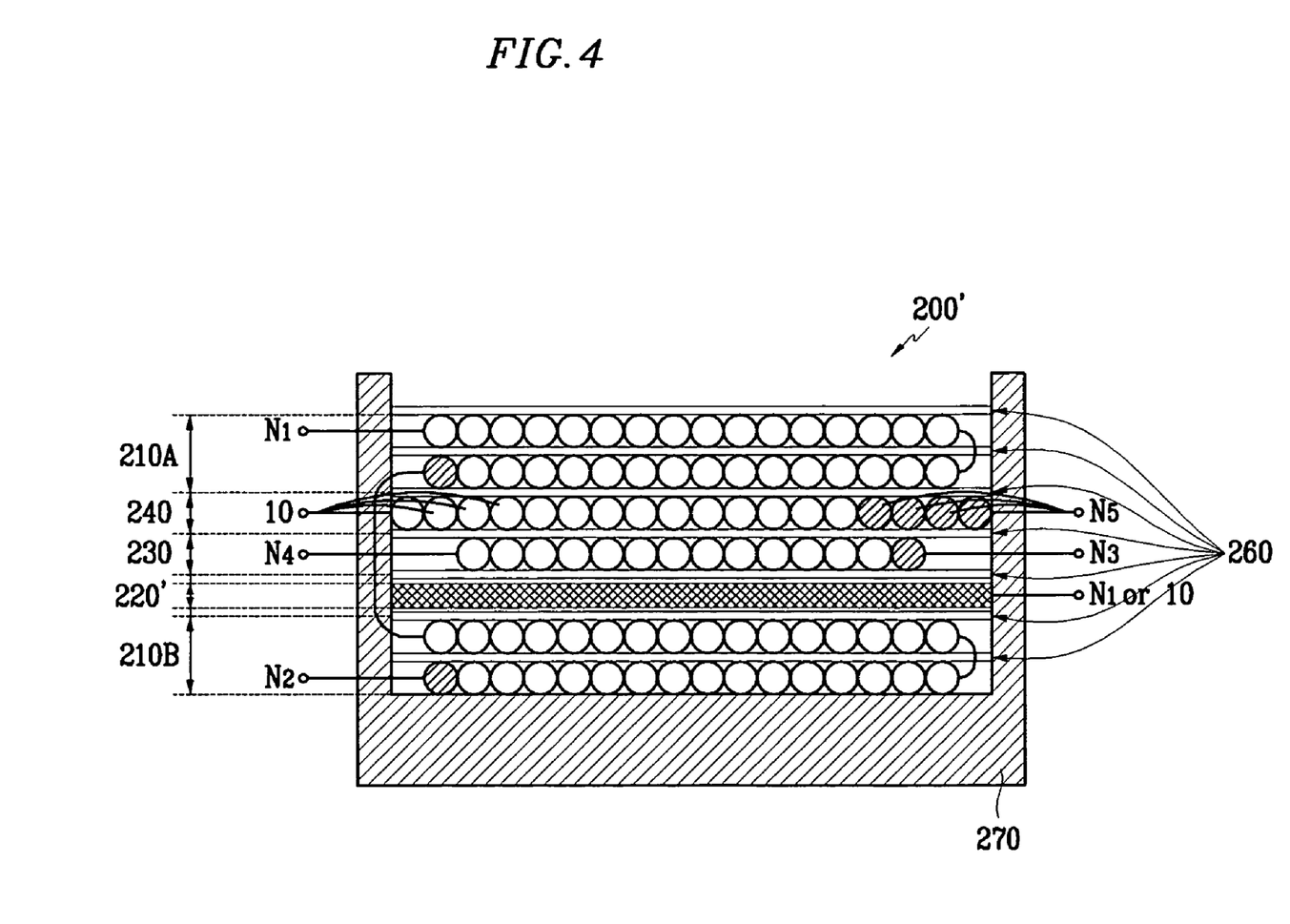
FIG. 4 shows a cross-sectional view of a transformer.

FIG. 4 illustrates that the shield winding 220 can be substituted with a conductive shield 220'.

FIG. 4 shows a cross-sectional view of an embodiment of a transformer 200'. The transformer 200' in FIG. 4 corresponds to the transformer 200 in FIG. 3 except the substitution of the shield winding 220 in FIG. 3 for a conductive shield 220'. The conductive shield 220' can be realized with a conductive material such as a foil. One of the functions of the conductive shield 220' corresponds to that of the shield winding 220. The reason for improving the EMI reduction through the conductive shield 220' is known to a person of an ordinary skill in the art, and no detailed corresponding description will be provided.

Figure 5:
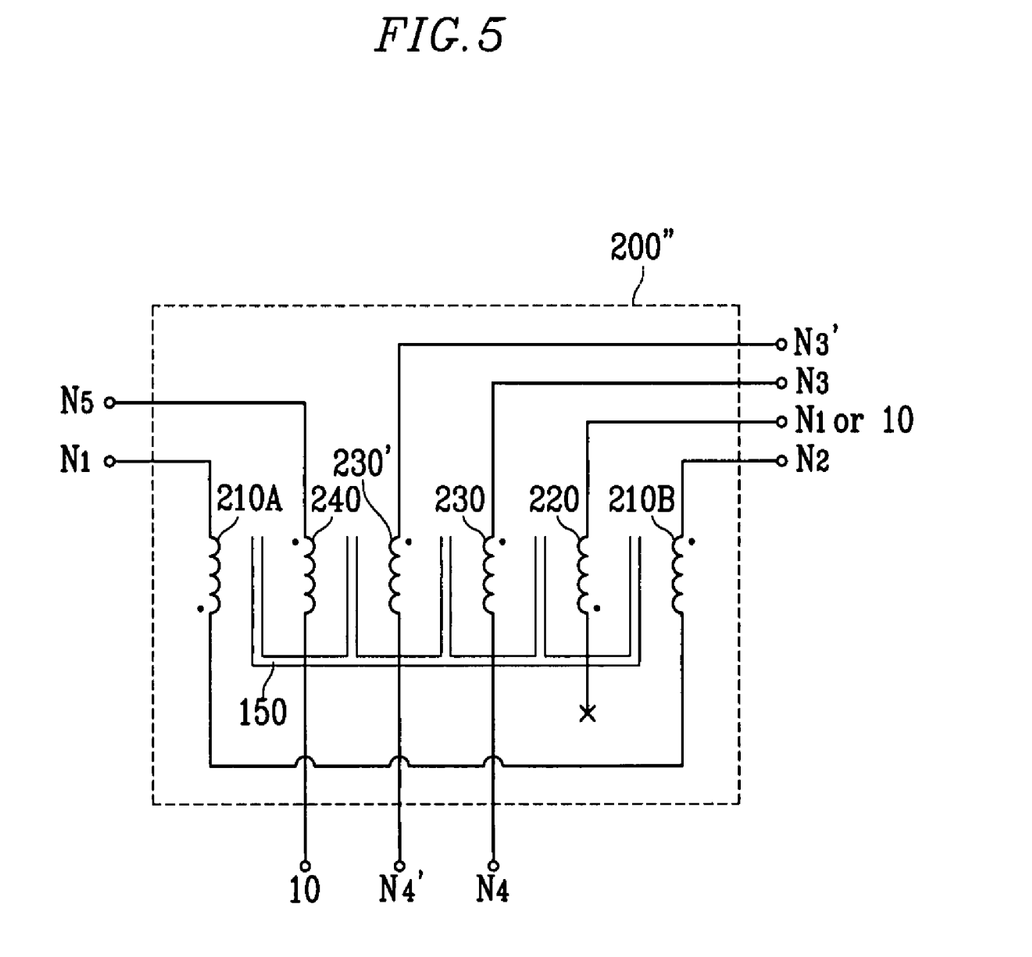
FIG. 5 shows a schematic diagram of a transformer.
Figure 6:
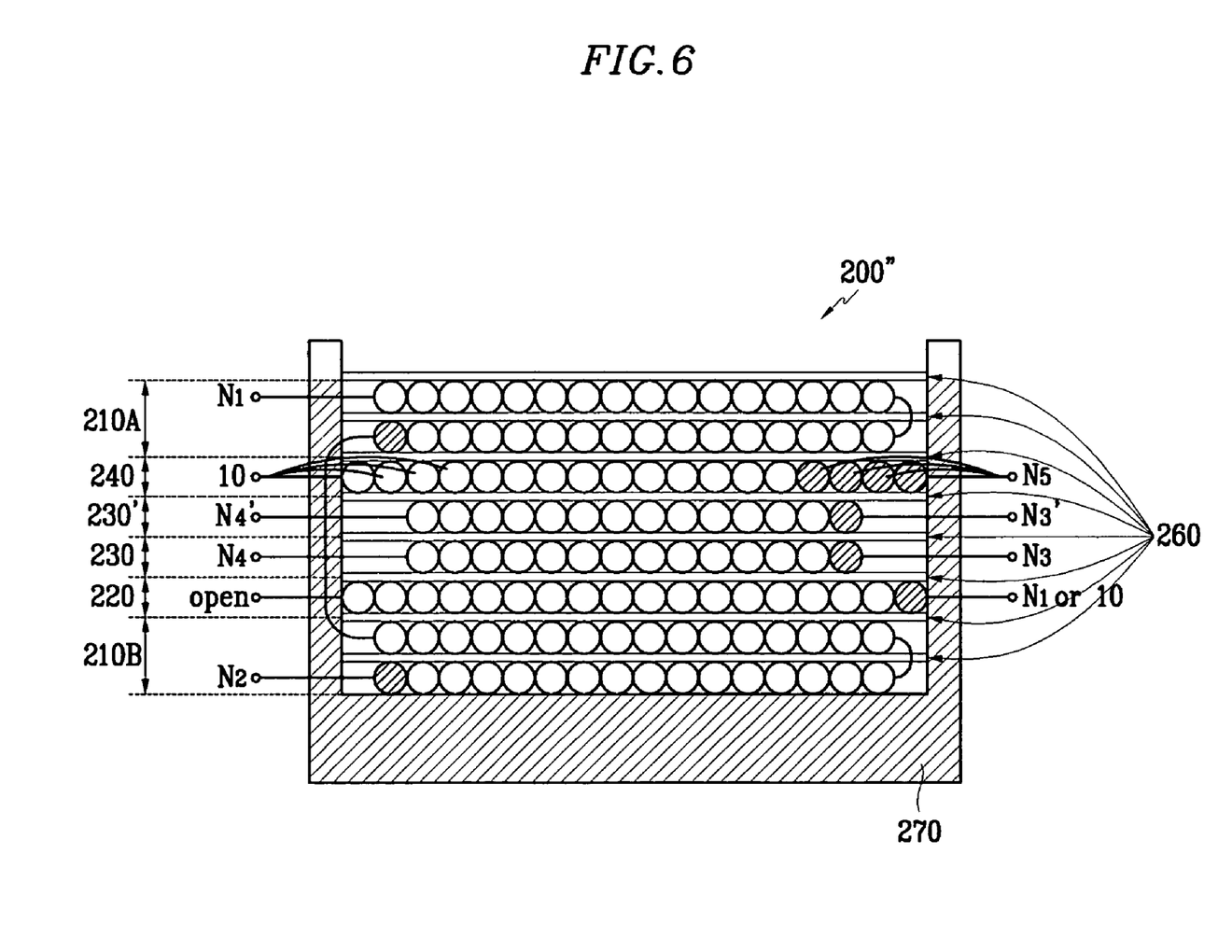
FIG. 6 shows a cross-sectional view of a transformer.

FIG. 5 shows a schematic diagram of another embodiment of a transformer 200", and FIG. 6 shows a corresponding cross-sectional view of the transformer 200".

The transformer 200" may correspond to the transformer of the embodiment of FIGS. 2-4, with the addition of a secondary winding 230'. The secondary winding 230' may be provided between the bias winding 240 and the secondary winding 230 and can have terminals N3' and N4'. A secondary circuit may be additionally connected to the terminals N3' and N4' of the secondary winding 230' to generate an additional output voltage Vout. FIG. 1 shows the case of a single output voltage Vout. In some embodiments, the converter can generate a plurality of output voltages Vout by using a plurality of secondary windings, which can be realized by e.g. adding the secondary winding 230' as shown in FIG. 5 and FIG. 6.

Analogously to the first embodiment, the primary winding of the transformer 200" can have an interleaved structure, and a shield winding 220 disposed between the second primary winding unit 210B and the secondary winding 230. The shield winding 220 of the transformer 200" can be substituted with a conductive shield as shown in FIG. 4. The bias winding 240 of the transformer 200" can be used to supply the bias voltage Vcc and it can also function as a shield in a like manner of the first exemplary embodiment.

In the described embodiments, the number of shields can be reduced by using the bias winding as a shield. The primary winding can be realized as an interleaved structure to reduce the leakage inductance and thereby improve the energy transfer efficiency between the primary winding and the secondary winding.

While this invention has been described in connection with specific embodiments, it is to be understood that the invention is not limited to the disclosed embodiments, but, on the contrary, is intended to cover various modifications and equivalent arrangements included within the spirit and scope of the appended claims.

What is claimed is:

1. An energy transfer element for transmitting energy of an input circuit to an output circuit, comprising:
    a first winding, coupled to the input circuit and wound as a first unit and a second unit;
    a second winding, coupled to the output circuit and wound between the first unit of the first winding and the second unit of the first winding; and
    a third winding, provided between the first unit of the first winding and the second winding and coupled to a bias voltage supply circuit for supplying a bias voltage used by the input circuit,
    wherein a winding width of the third winding is greater than a winding width of the first unit of the first winding and a winding width of the second winding.

2. The energy transfer element of claim 1, wherein the third winding is configured to reduce a displacement current, flowing between the first unit of the first winding and the second winding.

3. The energy transfer element of claim 1, further comprising
    a fourth winding, wound between the second unit of the first winding and the second winding.

4. The energy transfer element of claim 3, wherein a first end of the fourth winding is coupled to the input circuit, and a second end of the fourth winding is open.

5. The energy transfer element of claim 3, wherein a first end of the fourth winding is coupled to a ground of the input circuit, and a second end of the fourth winding is open.

6. The energy transfer element of claim 3, wherein a winding width of the fourth winding is greater than the winding width of the second unit of the first winding and the winding width of the second winding.

7. The energy transfer element of claim 1, further comprising
    a conductive shield disposed between the second unit of the first winding and the second winding.

8. The energy transfer element of claim 1, further comprising:
    a bobbin, on which the first to third windings are wound, wherein the windings are wound on the bobbin in the order of the second unit of the first winding, the second winding, the third winding, and the first unit of the first winding.

9. The energy transfer element of claim 1, wherein the third winding has a plurality of windings.

10. The energy transfer element of claim 1, wherein one of the two terminals of the third winding is coupled to a ground of the input circuit.

11. The energy transfer element of claim 1, wherein the first winding is an input winding of the energy transfer element and the second winding is an output winding of the energy transfer element.

12. The energy transfer element of claim 1, wherein the energy transfer element is used for a flyback converter.

13. The energy transfer element of claim 1, wherein the energy transfer element is used for a forward converter.

14. A converter, comprising:
an input circuit, configured to supply energy;
an output circuit, configured to output a predetermined energy corresponding to the energy supplied by the input circuit;
an energy transfer element, coupled between the input circuit and the output circuit, for transmitting energy of the input circuit to the output circuit with a predetermined ratio; and
a bias voltage supply circuit, configured to generate a bias voltage of an integrated circuit (IC) used in the input circuit;
wherein the energy transfer element comprises:
a first winding coupled to the input circuit and having a first unit and a second unit;
a second winding coupled to the output circuit and wound between the first unit of the first winding and the second unit of the first winding; and
a third winding, wound between the first unit of the first winding and the second winding, coupled to the bias voltage supply circuit, and configured to supply the bias voltage, configured to reduce a displacement current generated between the first unit of the first winding and the second winding.

15. The converter of claim 14, wherein a winding width of the third winding is greater than a winding width of the first unit of the first winding and a winding width of the second winding.

16. The converter of claim 14, wherein the third winding has a plurality of windings.

17. The converter of claim 14, wherein one of the two terminals of the third winding is coupled to a ground of the input circuit.

18. The converter of claim 14, wherein the energy transfer element further includes a bobbin on which the first to third windings are wound; and the windings are wound on the bobbin in the order of the second unit of the first winding, the second winding, the third winding, and the first unit of the first winding.

19. The converter of claim 14, wherein the energy transfer element further includes a fourth winding, wound between the second unit of the first winding and the second winding, configured to reduce a displacement current generated between the second unit of the first winding and the second winding.

20. The converter of claim 14, wherein the energy transfer element further includes a conductive shield, being provided between the second unit of the first winding and the second winding, configured to block a displacement current generated between the second unit of first winding and the second winding.

* * * * *